United States Patent [19]

Russo

[11] Patent Number: 4,480,073

[45] Date of Patent: * Oct. 30, 1984

[54] THERMOPLASTIC COMPOSITION CONTAINING A POLY(METHYL ETHENYL BENZENE) RESIN AND A POLY(PHENYLENE OXIDE) RESIN

[75] Inventor: Robert V. Russo, Brooklyn, N.Y.

[73] Assignee: Mobil Oil Corporation, New York, N.Y.

[*] Notice: The portion of the term of this patent subsequent to Aug. 18, 1998 has been disclaimed.

[21] Appl. No.: 282,627

[22] Filed: Jul. 13, 1981

Related U.S. Application Data

[63] Continuation-in-part of Ser. No. 119,901, Feb. 8, 1980, Pat. No. 4,284,733.

[51] Int. Cl.$^3$ ............................................. C08L 61/04
[52] U.S. Cl. ......................................... 525/68; 525/69; 525/132; 525/152
[58] Field of Search ................... 525/68, 69, 132, 152

[56] References Cited

U.S. PATENT DOCUMENTS

| | | | |
|---|---|---|---|
| 3,383,435 | 5/1968 | Cizek | 525/132 |
| 4,143,084 | 3/1979 | Kaeding et al. | 585/467 |
| 4,152,316 | 5/1979 | Cooper et al. | 525/68 |
| 4,306,049 | 12/1981 | Prapas | 526/347 |

Primary Examiner—Jacob Ziegler
Attorney, Agent, or Firm—Alexander J. McKillop; Michael G. Gilman; Edward J. Trojnar

[57] ABSTRACT

Thermoplastic blends having superior capability and homogeneity comprising a poly(phenylene oxide) resin and a resin of poly(methyl ethenyl benzene) isomers in which the predominant isomer is 1-methyl-4-ethenyl benzene, are disclosed. The poly(phenylene oxide) resin can contain substituted phenylene units and the poly(methyl ethenyl benzene) resin can be a polymer of solely methyl ethenyl benzene isomers, or a random, block or graft copolymer comprising 50 weight percent or more of methyl ethenyl benzene iosmers and up to 50 weight percent of other ethylenically unsaturated monomers.

6 Claims, No Drawings

THERMOPLASTIC COMPOSITION CONTAINING A POLY(METHYL ETHENYL BENZENE) RESIN AND A POLY(PHENYLENE OXIDE) RESIN

CROSS-REFERENCE TO RELATED APPLICATIONS

This application is a continuation-in-part of U.S. application Ser. No. 119,901 filed Feb. 8, 1980, now U.S. Pat. No. 4,284,733, which is incorporated herein by reference, in its entirety.

BRIEF SUMMARY OF THE INVENTION

This invention relates to thermoplastic blends having superior compatibility and homogeneity comprising 1 to 80 weight percent of poly(phenylene oxide) resin and 99 to 20 weight percent of a resin of poly(methyl ethenyl benzene) isomers in which the predominant isomer is 1-methyl-4-ethenyl benzene. The poly(phenylene oxide) resin can contain substituted phenylene units and the poly(methyl ethenyl benzene) resin can be a polymer of methyl ethenyl benzene isomers alone, or a random, block or graft copolymer comprising 50 weight percent or more of methyl ethenyl benzene isomers and up to 50 weight percent of other ethylenically unsaturated monomers.

DETAILED DESCRIPTION OF THE INVENTION

It is known that the properties of polymers can be altered and improved by physically blending two or more polymers. For example, polymers of phenylene oxide, which otherwise may have desirable physical properties, are difficult to fuse and therefore unsuitable for thermoplastic uses. It has therefore been suggested that poly(phenylene oxide) resins can be blended with polystyrene to produce a resinous blend having lower melting point and improved flow characteristics and which can be used in molding operations. The blending, for example, of poly(2,6-dimethyl-1,4-phenylene oxide) and high impact polystyrene is discussed by L. R. Schmidt "Viscoelastic Behavior of Poly(2,6-dimethyl-1,4-phenylene oxide), High Impact Polystyrene, and A 35-65 Blend", *Journal of Applied Polymer Science*, Vol. 23, p. 2463-2479 (1979).

Polystyrene and poly(phenylene oxide) resins are not, however, entirely or easily compatible and mechanical mixing of the two is accomplished only with some difficulty and with the result that the mixture of resins may not be completely homogenous and uniform.

According to the present invention, it has been found that poly(methyl ethenyl benzene) resins exhibit improved compatibility with poly(phenylene oxide) resins thereby facilitating blending of these components into a composition of superior texture, appearance and uniformity. The compositions of the invention comprise about 20 to 99 weight percent of a poly(methyl ethenyl benzene) resin comprising at least 50 weight percent of polymerized units derived from isomers of methyl ethenyl benzene consisting of about 0 to 0.1 percent by weight 1-methyl-2-ethenyl benzene, 0 to 15 weight percent 1-methyl-3-ethenyl benzene, and at least 85 weight percent 1-methyl-4-ethenyl benzene; and 80 to 1 weight percent of a poly(phenylene oxide) resin having the formula:

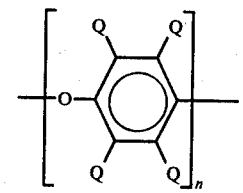

wherein each Q independently is hydrogen, a hydrocarbon radical, a halohydrocarbon radical having at least two carbon atoms between the halo atom and phenyl nucleus, or halogen, provided that Q is free of a tertiary carbon atom, and n is at least 20, preferably at least 50. Preferably the Q radicals are alkyl or haloalkyl 1 to 4 carbon atoms or halogen. The preferred halogen is chloro. Advantageously the poly(phenylene oxide) resin is poly(2,6-dimethyl-1,4-phenylene oxide) which typically has a molecular weight ($\underline{Mw}$) of about 50,000 and a ratio of $Mw/M_n$ of 4.2. Preparation of certain polymers of this class is described in U.S. Pat. No. 4,059,568 to Cooper, which patent is incorporated herein by reference.

The poly(methyl ethenyl benzene) resins which are an essential component of the present invention can be prepared from the methyl ethenyl benzene isomers alone or, alternatively, they may be random, block or graft copolymers derived from 50 weight percent or more of the methyl ethenyl benzene isomers and up to 50 weight percent other ethylenically unsaturated monomers.

The poly(methyl ethenyl benzene) resins useful in the present invention comprised entirely of polymerized methyl ethenyl benzene can be obtained by polymerizing a mixture of isomers in the following ratio:

| Isomer | Weight percent |
| --- | --- |
| 1-methyl-2-ethenyl benzene | less than 0.1, preferably less than 0.05. |
| 1-methyl-3-ethenyl benzene | less than 15, preferably less than 10. |
| 1-methyl-4-ethenyl benzene | 85-100 preferably at least 90. |

Generally, the proportion of the p-isomer (1-methyl-4-ethenyl benzene) will be at least 95 weight percent and the m-isomer (1-methyl-3-ethenyl benzene) will constitute less than 5 weight percent of the mixture. Particularly preferred mixtures contain 97 to 99 weight percent of the p-isomer and 1 to 3 weight percent of the m-isomer.

The mixture of the isomeric methyl ethenyl benzenes for the preparation of the poly(methyl ethenyl benzene) resins may be obtained by the catalytic dehydrogenation of a mixture of the corresponding ethyl toluenes, which in turn can be obtained by the selective alkylation process disclosed in U.S. Pat. No. 4,143,084 of Warren W. Kaeding and Lewis B. Young, the disclosure of which is incorporated herein by reference.

In its application to the production of methyl ethenyl benzenes, the method disclosed in the Kaeding and Young patent essentially involves the alkylation of toluene with ethylene in the presence of certain crystalline aluminosilicate zeolite catalyst. The catalyst has a silica to alumina ratio of at least 12 and a constraint index (defined in the patent) within the range of 1 to 12. The process produces an extremely high proportion of the 1-methyl-4-ethyl benzene isomer, with only a minor proportion of the 1-methyl-3-ethyl benzene isomer and negligible amounts of the 1-methyl-2-ethyl benzene isomer. The almost complete absence of the 1-methyl-2-ethyl isomer is highly advantageous because this isomer tends to produce undesired by-products during the dehydrogenation step (indanes and indenes which adversely affect the properties of the resultant polymers which cannot be easily separated from the methyl ethenyl benzenes).

The mixture of isometric methyl ethyl benzenes can be subjected to distillation prior to dehydrogenation step in order to separate out various by-products and after the dehydrogenation has been completed, a further distillation can be carried out to separate the methyl ethenyl benzenes from their saturated precursors.

Since the proportion of the 1-methyl-4-ethenyl benzene in the mixture is so high, usually at least 95 by weight, the mixture can be regarded essentially as "the para monomer" and the polymer produced by the polymerization of this mixture in the absence of other monomers as "the homopolymer" in order to distinguish it from polymers produced by polymerizing the mixture with other, copolymerizable monomers. It should, however, be remembered that "the homopolymer" may, in fact, be a copolymer of the isomeric monomers.

In general, the polymerization conditions appropriate to styrene will also be useful with the methyl ethenyl benzene. Thus, polymerization can be effected under bulk conditions or in solution, suspension or emulsion techniques comparable to those used for styrene polymerization. The polymerization catalysts may be of the free radical, anionic or cationic types. Suitable free radical initiators include ditertiary butyl peroxide, azo-bis (isobutyronitrile), di-benzoyl peroxide, tertiary butyl perbenzoate, dicumyl peroxide and potassium persulfate. Cationic initiators are generally of the Lewis acid type, for example, aluminum trichloride, boron trifluoride, boron trifluoride etherate complexes, titanium tetrachloride and the like. Anionic initiators are generally of the formula $RM_y$ where R is organo, mono- or polyvalent and may be alkyl, alkenyl, aryl, aralkyl, and alkaryl, and can contain from 1 to about 50 carbon atoms; and y is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium cumyl potassium, methyl potassium, ethyl potassium, and so forth may be used in this reaction. Also, metal initiators containing a dianion, such as the alkali metal salts of 1,1-diphenylethylene and alpha-methylstyrene tetramer and the radical anion initiators of the sodium naphthalene type may be used. Branched chain polymers may be obtained by using multifunctional initiators, for example, 1,3,5-trilithiocyclohexane and 1,4,7,10-tetrapotassiodecane. In the anionic polymerization each molecule of the initiator starts one anionic polymer chain; multiple anions can permit addition of secondary chains to the main chain. Stereospecific catalysts can also be used to advantage. Such catalysts are generally of the well known Ziegler type, comprising a transition metal of Group 4A, 5A, 6A or 7, a valence state lower than its maximum in combination with an organometallic compound of Group 2 or 3.

Among the reducible transitional metal compounds suitable for the purpose of this invention are the heavy metal, inorganic compounds such as halides, oxyhalides, complex halides, hydroxides, and organic compounds such as alcoholates, acetates, benzoates, and acetyl acetonates, of the requisite metals. Such metals include titanium, zirconium, hafnium, thorium, uranium, vanadium, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium tetrabromide, zirconium tetrachloride, vanadium tetrachloride and zirconium acetylacetonate.

The reduction can be effected in any suitable manner, for example, by reduction with hydrogen or aluminum. Titanium tetrachloride can be readily reduced to titanium trichloride by reduction with hydrogen, aluminum or titanium metal. Suitable reduction methods are well known in the art and are described, for example, in U.S. Pat. No. 3,362,940 which is incorporated herein by reference.

The other component of the catalyst system is at least one organometallic compound of a metal of Groups 2 or 3. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radical, alkoxy, amino, hydrogen etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromoaluminum hydride, dipropylaluminum hydride, propyl zinc hydride, ethylmagnesium hydride, and methoxyaluminum diethyl. Mixtures of two or more organometallic compounds can be used.

The catalyst can be formed by methods well known in the art. Thus, for example, it can be made by charging the components separately to the polymerization zone or they can be combined immediately prior to entry into the zone.

As previously mentioned the polymerization may be carried out in bulk, in solution, in suspension or in emulsion. Solution polymerization will generally employ inert hydrocarbon solvents such as toluene, benzene or ethyl toluene. Suspension polymerization is generally carried out in an aqueous medium comprising water and suspending agents such as calcium phosphates, polyvinyl alcohol, hydroxyethyl cellulose or sodium polyacrylates. Suitable suspension polymerization techniques will be comparable to those used with the styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

Polymerization can also be carried out thermally.

The polymerization conditions will generally be similar to those used for styrene. Thus temperatures will generally be in the range of 0° to 200° C., preferably 50° to 150° C., with a range of about −80° C. to +30° C. being most appropriate for cationic polymerization.

The methyl ethenyl benzene polymers which can contribute one component of the compositions of the invention are notable for a higher Vicat softening temperature than polystyrene. Vicat softening temperature is measured by ASTM method D-1525. It, also, has been found to vary with the content of p-isomer in the monomer mixture, as shown below in Table 1.

TABLE 1

| Content of 1-methyl-4-ethenyl benzene, wt. percent | Vicat °C. + 1° C. |
|---|---|
| 99.7 | 118 |
| 97.0 | 119 |
| 95.5 | 114 |
| 89.3 | 108 |

By comparison, styrene has a Vicat of about 107° to 108° C. and the polymer of "vinyl toluene" a Vicat of only 97° C. Thus, the homopolymers prepared from the above described mixture are characterized by a Vicat temperature of at least 100° C., generally at least 110° C. or 112° C.

The polymers will generally have a molecular weight corresponding to intrinsic viscosities of 0.1 to 10 (toluene/30° C.). This will generally correspond to molecular weights of at least 30,000, with most molecular weights (Mv—viscosity average) being about 250,000 to 275,000 for commercial materials. The glass transition temperatures for very low molecular weight materials (below 50,000) may be lower than those indicated and therefore not suited for uses where solid state properties are desired. The melt indices will normally be in the range of 1.0 to 10.0, generally 4.0 to 7.0. Relative densities of the polymers are comparable to those of styrene, being just above 1.0, generally about 1.01. Good optical properties as indicated by transmittances of at least 88% are typical of the polymers. The pentane uptake is generally about 40%, as compared to about 1–2% for polystyrene, thereby indicating a greater affinity for hydrocarbons.

Another class of poly(methyl ethenyl benzene) resins particularly desirable for use in the present invention are the high impact copolymers produced by grafting units derived from the above described polymerizable mixture onto a backbone polymer which is generally of a rubbery nature. Suitable backbone polymers include polybutadiene, poly(dimethyl butadiene), polyisoprene, polychloroprene and other synthetic rubbers such as the styrene-butadiene rubbers (SBR), ethylene-propylene rubbers (EPR), ethylene-propylene-diene elastomers, polyacrylates, nitrile rubbers and copolymers with other aromatic monomers including vinyl toluene. The backbone will generally comprise 2 to 25 percent by weight of the high impact copolymer, preferably 3 to 15% by weight, most preferably 5 to 10 percent by weight. Normal techniques, e.g., grafting, comparable to those used for making high impact polystyrenes are useful; they are well known in the art and referred to, for example, in U.S. Pat. No. 2,694,692 and British Pat. No. 1,054,301.

Random copolymers formed with methyl ethyl benzene isomers and butadiene can also be used in the invention. They can be produced by methods similar to those used in the manufacture of GR-S synthetic rubber and described, for example, in "Synthetic Rubber", Ed. Whitby et al, John Wiley, New York, 1954. A suitable polymerization mixture is shown in Table 2 below:

TABLE 2

Butadiene - MEB Polymerization Formula

| | Parts per 100 parts Total Monomers |
|---|---|
| Butadiene | 70 |
| Methyl-ethenyl benzene mixture | 30 |
| Dodecyl mercaptan | 0.5 |
| Potassium persulfate | 0.23 |
| Soap (anhydrous basis) | 4.3 |
| Water | 180 |
| | 285.03 |

Block copolymers comprising at least 50 weight percent of the mixture of methyl ethenyl benzene monomers described above can be prepared by methods well known in the art and can be used as a component of the composition of this invention.

The composition of the present invention can also obtain various additives to impart desired characteristics. Typical of these additives are fire retardants such as brominated or chlorinated aromatic or aliphatic compounds or antimony oxide, reinforcing agents such as fiber glass and calcium oxide, and release agents and pigments.

A particular advantage of the present invention is in the compatibility and ease of mixing of the poly(methyl ethenyl benzene) resin and the poly(phenylene oxide) resin. Mixing of the component resins may be accomplished by conventional mixing techniques using, for example, a single or twin screw extruder typically operated at a speed of about 10–80 rpm. Sufficient heat is applied during mixing to melt the components. Preferably this will be 260°–280° C. Usually, after 2–15 minutes of mixing the components become sufficiently molten to accomplish blending.

The invention is illustrated by the following non-limiting examples.

EXAMPLE 1

25 grams of high impact resin comprising 10 percent by weight polybutadiene graft copolymerized with an isomeric mixture of 97.4 percent by weigth 1-methyl-4-ethenyl benzene, 2.6 weight percent 1-methyl-3-ethenyl benzene, and 0.05 weight percent 1-methyl-2-ethenyl benzene were blended with 25 grams of poly(2,6-dimethyl-1,4-phenylene oxide) resin having a molecular weight of 50,000 by charging both resins into a Brabender PlastiCorder and mixing at 260° C. and 60 rpm for 10 minutes beyond the point at which the resins become molten. This procedure was repeated three times until a total of 200 grams of the mixture was prepared. The resulting mixture was homogenous and clearly the components were compatible. Izod specimens were prepared by compression molding at 270° C. and 20,000 psi on a Pasadena press. A notch test was performed on the test specimens under ASTM condition and a value of 0.54 ft.-lb/in obtained.

EXAMPLE 2

The procedures of Example 1 were repeated except that 15 grams of the high impact resin were blended with 35 grams of the poly(2,6-dimethyl-1,4-phenylene oxide) resin. A notched Izod test value of 0.50 ft.-lb./in was obtained, and the mixture was entirely homogenous and compatible.

EXAMPLE 3

The procedure of Example 1 was followed but with the quantity of high impact resin increased to 35 grams and the quantity of the poly(phenylene oxide) resin reduced to 15 grams. The mixture was entirely homogenous and compatible. The notched Izod value was 1.0 ft-lb/in of notch.

EXAMPLE 4

The procedure of Example 1 was followed except that high impact polystyrene having a melt index at 200° C. and 5000 grams load of 4.6 was substituted for the high impact copolymer resin. The polystyrene was used in equal amounts by weight with the poly(phenylene oxide) resin but mixed with greater difficulty and produced a grainy-textured, non-uniform product. Notched Izod was 0.77 ft-lb/in of notch.

EXAMPLE 5

The procedure of Example 4 was followed but with the quantity of high impact polystyrene resin reduced to 15.0 grams and the quantity of poly(phenylene oxide) resin increased to 35.0 grams. The two components mixed with great difficulty and resulted in a grainy-textured non-uniform product. The notched Izod of the mixture was 0.50 ft.-lb/in of notch.

EXAMPLE 6

The procedure of Example 4 was followed except that the quantity of high impact polystyrene resin was increased to 35.0 grams and the quantity of the poly(phenylene oxide) resin was reduced to 15 grams. The two components mixed with great difficulty and resulted in a grainy-textured non-uniform product. The notched Izod of the mixture was 0.90 ft-lb/in of notch.

EXAMPLE 7

5 lbs of the high impact resin of Example 1, and 5 lbs of the poly(phenylene oxide) resin were mixed by tumbling in a 5 gallon pail fitted with a plastic liner. The resulting mixture of resins was fed into the hopper of a 1½-inch Davis Standard single-screw extruder and compounded and pelletized at 50 rpm. The extruder barrel settings were 270° C. The resulting product was homogenous, and upon injecton molding gave the following properties: Notched Izod—3.0 ft-lb/in of notch; tensile break strength—7540 psi; flexural modulus—294,000.

EXAMPLE 8

The procedure of Example 7 was repeated but replacing the 5.0 lb of the high impact resin of Example 1 resin with polystyrene high impact resin. After compounding and pelletizing, the product was non-homogenous, with streaks and white particles of unblended poly(phenylene oxide) resin clearly visible. After injection molding the following properties were found: Notched Izod—12.8 ft-lb/in of notch; tensile break strength—7630 psi; flexural modulus—297,000 psi.

In all instances where poly(phenylene oxide) resin and polystyrene were compounded, some unmixed particles of poly(phenylene oxide) resin were visible in the final product, regardless of time/temperature profiles selected. For mixtures of poly(phenylene oxide) resin and poly(methyl ethenyl benzene) resin, complete mixture was obtained in every case. No separate particles of poly(phenylene oxide) resin were visible.

EXAMPLE 9

When the components of Example 4 were mixed for 10 minutes, a time equal to that of Example 1, only a poor mixture resulted. Severe material separation was visible on examination of the melt. The components required additional compounding for 15 minutes, for a total of 28 minutes, before even a modest degree of mixing was obtained.

What is claimed is:

1. A polymeric composition comprising homogeneous and compatible blend of about
   (a) 20 to 99 weight percent of a high impact copolymer comprising 5 to 10 weight percent of a polybutadiene backbone and grafted thereto polymeric units derived from a mixture of isomers of methyl ethenyl benzene consisting essentially of 0 to 0.05 weight percent 1-methyl-2-ethenyl benzene, 1 to 5 weight percent 1-methyl-3-ethenyl benzene, and at least 95 weight percent 1-methyl-4-ethenyl benzene; and
   (b) 80 to 1 weight percent of a poly(phenylene oxide) resin having the formula

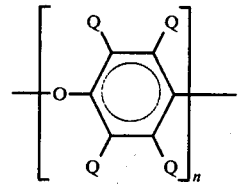

were each Q independently is hydrogen, a hydrocarbon radical, a halohydrocarbon radical having at least two carbon atoms between the halogen atom and phenyl nucleus, or halogen, provided that each is free of a tertiary carbon atom; and n is at least 20.

2. The composition of claim 1 wherein said poly(phenylene oxide) resin is poly(2,6-dimethyl-1,4-phenylene oxide).

3. The composition of claim 1 wherein said mixture of isomers consists essentially of at least 90% by weight 1-methyl-4-ethenyl benzene, 1–10% by weight 1-methyl-3-ethenyl benzene, and 0 to 0.1% by weight 1-methyl-2-ethenyl benzene.

4. The composition of claim 3 wherein said mixture of isomers consists essentially of at least 95 percent by weight 1-methyl-4-ethenyl benzene, 1 to 5 percent by weight 1-methyl-3-ethenyl benzene and 0 to 0.5 percent by weight 1-methyl-2-ethenyl benzene.

5. The composition of claim 3 wherein said mixture of isomers consists essentially of at least 97 percent by weight 1-methyl-4-ethenyl benzene and 1 to 3 percent by weight 1-methyl-3-ethenyl benzene.

6. The composition of claim 1 in which n is at least 50.

* * * * *